United States Patent [19]

Zimin et al.

[11] Patent Number: 5,142,030
[45] Date of Patent: Aug. 25, 1992

[54] DISAZO COLORANTS HAVING A 4,4′-DIAMINOBENZANILIDE TETRAZO COMPONENT

[75] Inventors: Alejandro Zimin; Michael R. Friswell, both of Wayne; Adam E. Verillo, Paterson, all of N.J.

[73] Assignee: Morton International, Inc., Chicago, Ill.

[21] Appl. No.: 748,152

[22] Filed: Aug. 21, 1991

[51] Int. Cl.⁵ .................... C09B 35/023; C09D 11/00
[52] U.S. Cl. .................... 534/649; 534/582; 534/819
[58] Field of Search .................... 534/649, 819

[56] References Cited

U.S. PATENT DOCUMENTS 1,153,555  9/1915  Levinstein et al. ............ 534/819 X
3,657,218  4/1972  Gnad .............................. 534/819 X
3,764,273 10/1973  Turner et al. ................... 534/649 X Primary Examiner—Robert W. Ramsuer
Assistant Examiner—Fiona T. Powers
Attorney, Agent, or Firm—Wayne E. Nacker; Gerald K. White

[57] ABSTRACT

Novel dyes are provided having the formula:

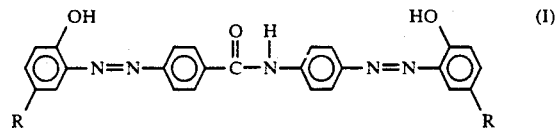

wherein the R's are the same or different and each is a $C_6$-$C_{12}$ alkyl.

2 Claims, No Drawings

DISAZO COLORANTS HAVING A 4,4'-DIAMINOBENZANILIDE TETRAZO COMPONENT

The present invention is directed to colorants which are non-toxic and which exhibit solubility in a wide range of organic solvents.

BACKGROUND OF THE INVENTION

A yellow dye which recently had widespread application is the diazo coupling product of o-tolidine and p-nonyl phenol. This product is no longer manufactured due to the carcinogenic nature of o-tolidine. There exists a need for a replacement yellow dye which is non-toxic and non-carcinogenic. It if further desirable that such a dye exhibit solubility in a wide range of organic solvents so that the dye may be utilized in a wide range of dye applications.

SUMMARY OF THE INVENTION

In accordance with the invention, a class of dyes exhibiting solubility in a wide range of polar and non-polar organic solvents have the formula:

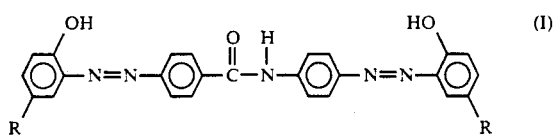

where the R's are the same or different and are each selected from $C_6$-$C_{12}$ alkyl.

DETAILED DESCRIPTION OF CERTAIN PREFERRED EMBODIMENTS

The dyes of the present invention are synthesized by tetrazo coupling of 4,4' diamino benzanilide (DABA) to a p-alkylated phenol having 6 to 12 carbons in the alkyl group. The reaction is generally represented as follows:

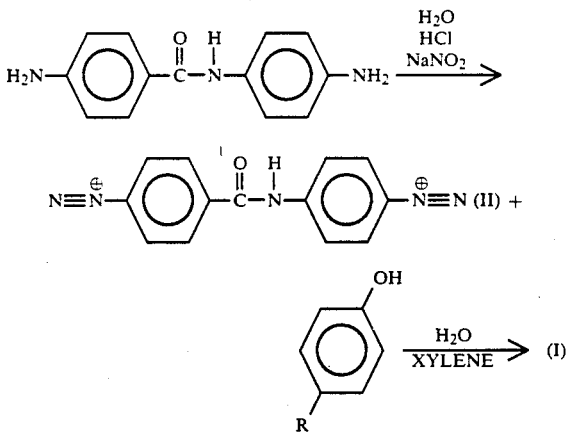

A currently preferred phenol for coupling with DABA is p-nonyl phenol, i.e., to produce a dye in which each of the R's are $C_9H_{19}$.

The novel dyes of this invention are mostly liquid at room temperature; consequently, they are easy to mix with suitable solvents. A significant advantage of the dyes of the invention are that they are soluble in a wide variety of organic solvents, both polar and non-polar. As such, the dyes have a wide variety of uses. Solvents in which the dyes are soluble and utility of various solutions are:

1. xylene—wood stains, varnishes, felt tip marker pens, petroleum colorants,
2. n-propanol—felt tip marker pens, decorative coatings, ink jet inks,
3. toluene—publication gravure inks,
4. Aromatic 200—coloration of petroleum products,
5. Dowanol EPH—ballpoint pen inks, ink jet inks,
6. methyl ethyl ketone—ink jet inks, gravure printing inks,
7. ethyl acetate—printing inks for the graphic arts industry.

An important advantage of the novel dyes are that they are non-toxic and non-carcinogenic. Other advantages of the dyes are that they exhibit superior lightfastness, non-migration and non-bleeding in various end-use applications, superior wood grain penetration in wood stain applications and superior non-strike-thru characteristics in the writing instrument industry.

EXAMPLE 1

The following is a protocol for coupling DABA with 2 moles of p-nonyl phenol.

To a 4 liter reaction flask, charge 525 ml water, 3 drops Sotex N and 75.27 grams 4,4-diaminobenzanilide. Stir 2 hours to wet out. Cool reaction mass to 3°–6° C. with ice and add 229 grams HCl (116 g/mole) while maintaining temperature below 15° C. with additional ice; stir for 90 minutes. Tetrazotize at 0° C. with 45.8 grams $NaNO_2$ (100%) equivalent as solution to a positive sulfone reagent test.

Add to tetrazo, 192 grams p-nonyl phenol diluted in 228 grams xylene. Now, add 173 grams KOH (45%) over 30 minutes to a final pH of 11–11.5. Maintain temperature 4°–10° C. throughout with ice. Monitor reaction progress with appropriate indicator solutions. Once coupling is complete, adjust pH down 5.5 with dilute HCl solution, add 4.5 grams Petrotec 7400, stir 2 minutes, shut off agitator and heat to 70° C. Separate lower aqueous phase and discard.

Add to organic dye phase 1900 grams of a 10% sodium chloride solution, and 4.5 grams Petrotec 7400; stir while adjusting pH to 6.5–7.0 with dilute HCl. Shut off agitator and heat to 70° C. Separate off lower aqueous phase.

Work up final dye by vacuum stripping volatiles to a maximum temperature of 120° C. Standardize to proper concentration by incremental additions of appropriate solvent based on end use application requirements.

The dye produced by this protocol exhibits a lambda max in the visible range of about 408 nm.

While the invention has been described in terms of certain preferred embodiments, modifications obvious to one with ordinary skill in the art may be made without departing from the scope of the present invention.

Various features of the invention are set forth in the following claims.

What is claimed:

1. A dye having the formula:

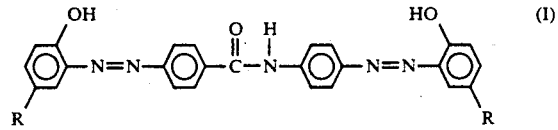

wherein the R's are the same or different and each is a $C_6$-$C_{12}$ alkyl group.

2. A dye according to claim 1 wherein each of the R groups is $C_9H_{19}$.

* * * * *